United States Patent
Oh et al.

(10) Patent No.: US 8,951,334 B2
(45) Date of Patent: Feb. 10, 2015

(54) ELECTRIC DUST COLLECTOR APPARATUS IN ELECTROSTATIC PRECIPITATOR SYSTEM AND METHOD FOR ELECTROSTATIC PRECIPITATION THEREBY

(71) Applicant: Zihom Co., Ltd., Seongnam-si (KR)

(72) Inventors: Dong Jin Oh, Suwon-si (KR); Kun Hee Kim, Daegu (KR); Seong Jin Hwang, Ansan-si (KR)

(73) Assignee: Zihom Co., Ltd. (KR)

( * ) Notice: Subject to any disclaimer, the term of this patent is extended or adjusted under 35 U.S.C. 154(b) by 0 days.

(21) Appl. No.: 14/291,502

(22) Filed: May 30, 2014

(65) Prior Publication Data

US 2014/0260972 A1 Sep. 18, 2014

Related U.S. Application Data

(63) Continuation of application No. PCT/KR2013/010911, filed on Nov. 28, 2013.

(30) Foreign Application Priority Data

| Nov. 30, 2012 | (KR) | 10-2012-0138423 |
| Sep. 5, 2013 | (KR) | 10-2013-0106663 |
| Nov. 27, 2013 | (KR) | 20-2013-0009762 |

(51) Int. Cl.
| *B03C 3/00* | (2006.01) |
| *B03C 3/16* | (2006.01) |
| *B03C 3/017* | (2006.01) |
| *B03C 3/38* | (2006.01) |
| *B03C 3/41* | (2006.01) |
| *B03C 3/53* | (2006.01) |
| *B03C 3/60* | (2006.01) |
| *B03C 3/36* | (2006.01) |
| *B01D 46/02* | (2006.01) |

(52) U.S. Cl.
CPC . *B03C 3/017* (2013.01); *B03C 3/38* (2013.01); *B03C 3/41* (2013.01); *B03C 3/53* (2013.01); *B03C 3/60* (2013.01); *B03C 3/368* (2013.01); *B01D 46/02* (2013.01)
USPC .................................................. 95/58; 96/52

(58) Field of Classification Search
CPC ........ B01D 46/02; B01D 46/40; B01D 46/10; B01D 53/323; B03C 3/08; B03C 3/16; B03C 3/53
USPC .................................................. 95/58; 96/52
See application file for complete search history.

(56) References Cited

FOREIGN PATENT DOCUMENTS

| EP | 2246117 | * 11/2010 | ................ B03C 3/16 |
| JP | 06159093 | 6/1994 | |
| JP | 2008062172 | 3/2008 | |
| KR | 1020100065693 | 6/2010 | |
| KR | 101233390 | * 2/2013 | ................ B03C 3/38 |

* cited by examiner

*Primary Examiner* — Robert Clemente
*Assistant Examiner* — Joubert X Glover
(74) *Attorney, Agent, or Firm* — Onello & Mello, LLP

(57) ABSTRACT

Disclosed are an electric dust collector apparatus in an electrostatic precipitator system and a method for electrostatic precipitation thereby. The electric dust collector apparatus includes a flow liquid dust collector part collecting charged dust in a liquid flowing to its one side surface, and a counter unit located opposite to the flow liquid dust collector part and including a metal plate charged with the same polarity with the charged dust to guide the induced charged dust to flow toward the flow liquid dust collector part, wherein the counter unit further includes a coating including an insulating material coating the metal plate.

11 Claims, 14 Drawing Sheets

ELECTRIC DUST COLLECTOR APPARATUS IN ELECTROSTATIC PRECIPITATOR SYSTEM AND METHOD FOR ELECTROSTATIC PRECIPITATION THEREBY

RELATED APPLICATIONS

This application is a continuation of International Application Number PCT/KR2013/010911, filed on Nov. 28, 2013, which claims the benefit of Korean Patent Application No. 10-2012-0138423, filed on Nov. 30, 2012 in the Korean Intellectual Property Office, Korean Patent Application No. 10-2013-0106663, filed on Sep. 5, 2013 in the Korean Intellectual Property Office, and Korean Utility Model No. 20-2013-0009762, filed on Nov. 27, 2013 in the Korean Intellectual Property Office, the contents of which applications are incorporated herein in their entirety by reference.

TECHNICAL FIELD

The present inventive concept relates to an electric dust collector apparatus in an electrostatic precipitator system and a method for electrostatic precipitation thereby. More particularly, the present inventive concept relates to an electrostatic precipitator system including an electric dust collector apparatus including a charging device having a carbon fiber brush with a plurality of carbon fiber bundles capable of achieving cost-effectiveness and a maximized charging effect by optimizing the number and diameter value of each of the plurality of carbon fiber bundles provided in the carbon fiber brush, a dust collecting device including a flow liquid dust collector part collecting flow liquid dust flowing along its one side surface, and a counter unit coated with an insulating material.

BACKGROUND ART

An electric dust collector apparatus refers to an apparatus for purifying gases by applying an electric field to microparticles contained in the gases, such as air to impart electricity to the microparticles and collecting the charged microparticles using an electrostatic force. Among various electrostatic precipitation methods, a wet electrostatic precipitation method is a method of removing contaminants collected in a dust collecting plate using an electric dust collector apparatus additionally provided with a cleaning water supplying device and a circulating device.

FIG. 1 is a cross-sectional view of a wet electrostatic precipitator including a conventional continuous dust collector cleaning apparatus.

As shown in FIG. 1, the wet electrostatic precipitator including the conventional continuous dust collector cleaning apparatus (disclosed in Korean Patent Publication No. 10-2010-0065693) includes a plurality of discharge electrodes 140 which is fixedly installed on a discharge electrode gap maintaining rod and to which a high voltage is applied, a plurality of collecting electrodes 150 which are separately installed between the discharge electrodes 140 and are specially processed to reduce a critical surface tension of surfaces of the collecting electrodes 150, a reinforcing rod which is installed between the collecting electrodes 150 to maintain gaps between the collecting electrodes 150, a washing pipe header unit including a unit injection device for radially injecting cleaning water onto the surfaces of the collecting electrodes 150, and a water channel 180 which is installed under the collecting electrodes 150 and prevents the cleaning water from flowing into the discharge electrode gap maintaining rod to which a high voltage is applied. The disclosed wet electrostatic precipitator can fundamentally block adhesive particles from depositing on the surfaces of the collecting electrodes 150 by continuously forming a stable water film on the surfaces of the collecting electrodes 150 with a minimum amount of cleaning water. Accordingly, intermittent cleaning works conducted after blocking application of high voltage power can be minimized, thereby maintaining high efficiency of the wet electric dust collector apparatus.

The wet electrostatic precipitator including a conventional continuous dust collector cleaning apparatus shown in FIG. 1 may prevent the microparticles from being deposited on the surfaces of the collecting electrodes by allowing cleaning water to flow into on the surfaces of the collecting electrodes. However, since the microparticles are collected based on attraction with respect to the collecting electrodes, the microparticle deposition preventing effect cannot be sufficiently achieved just by allowing cleaning water to flow into on the surfaces of the collecting electrodes.

In addition, the wet electrostatic precipitator including a conventional continuous dust collector cleaning apparatus may confront several problems, including reduced dust collecting efficiency due to microparticles remaining on the collecting electrodes, a risk of ozone production, and so on. Further, since the wet electrostatic precipitator including a conventional continuous dust collector cleaning apparatus includes a charged metal plate exposed therein, electric shocks may be highly likely to occur to a user and there are rising concerns over occurrence of fire accidents due to a spark caused by a direct contact between dust and the metal plate.

<Cited Reference 1: Korean Patent Publication No. 2010-0065693>

DISCLOSURE OF THE INVENTION

In order to overcome the above-mentioned shortcomings, embodiments of the present inventive concept provide an electric dust collector apparatus in an electrostatic precipitator system having carbon fiber brushes, which can achieve cost-effectiveness and a maximized charging effect by optimizing the number and diameter value of each of the plurality of carbon fiber bundles provided in the carbon fiber brush, and a method for electrostatic precipitation thereby.

Embodiments of the present inventive concept also provide a charging device having a carbon fiber brush with 10000 to 30000 carbon fiber bundles having a diameter of 2 to 3 μm, thereby maximizing a charging effect by minimizing generation of ozone ($O_3$), and a charging method using the same.

Embodiments of the present inventive concept also provide an electric dust collector apparatus, which prevent dust from depositing by collecting the dust in a liquid, and an electrostatic precipitation method.

Embodiments of the present inventive concept also provide an electric dust collector apparatus, which is advantageous in maintaining and preserving a product because it is not necessary to separately clean a dust collector part, which can suppress a risk of an electric shock accident from being caused to a user because the dust collector part is formed of a liquid flow dust collector part and a counter unit is coated with an insulating material to prevent a metal plate of the counter unit from being directly exposed to the user, and which can prevent a fire accident from occurring by preventing spark generation due to a direct contact between the dust and the metal plate.

Additional aspects, advantages and/or new characteristics of the inventive concept will be set forth in part in the description that follows and, in part, will be obvious from the detailed description and preferred embodiments of the inventive concept.

According to an aspect of the inventive concept, there is provided an electric dust collector apparatus in an electrostatic precipitator system, the electric dust collector apparatus including a flow liquid dust collector part collecting charged dust in a liquid flowing to its one side surface, and a counter unit located opposite to the flow liquid dust collector part and including a metal plate charged with the same polarity with the charged dust to guide the induced charged dust to flow toward the flow liquid dust collector part, wherein the counter unit further includes a coating including an insulating material coating the metal plate.

According to another aspect of the inventive concept, there is provided a method for electrostatic precipitation by an electric dust collector apparatus in an electrostatic precipitator system, the method including applying a voltage having the same polarity with charged dust to a metal plate of a counter unit by means of a voltage applying part and allowing a liquid stored in a water tank to be induced into a liquid supply path by actuating a circulation pump so that the liquid flows along a side surface of a flow liquid dust collector part, allowing external air having the charged dust to be induced and guiding the external air to move to the flow liquid dust collector part by means of the counter unit, collecting the charged dust by the liquid flowing in the flow liquid dust collector part, and exhausting the external air having the charged dust collected therein.

According to still another aspect of the inventive concept, there is provided an electric dust collector apparatus in an electrostatic precipitator system, the electric dust collector apparatus including a flow liquid dust collector part including a flow plate provided at its one side surface and made of a non-metal material and containing a liquid having charged dust while flowing on the flow plate, and a counter unit installed at a location opposite to the flow plate and including a metal plate charged with the same polarity with the charged dust and migrating the charged dust to the flow liquid dust collector part by a repulsive force to collect the dust in the liquid and a coating applied to the metal plate and made of an insulating material.

According to still another aspect of the inventive concept, there is provided an electric dust collector apparatus in an electrostatic precipitator system, the electric dust collector apparatus including a flow liquid dust collector part collecting charged dust in a liquid flowing to its one side surface, a counter unit provided at a location opposite to the flow liquid dust collector part and including a metal plate charged with the same polarity with the charged dust to guide the induced charged dust to flow toward the flow liquid dust collector part and a coating covering the metal plate to prevent the metal plate from being exposed to the outside of the metal plate and made of an insulating material, a water tank storing the liquid flowing in the flow liquid dust collector part, a liquid supply path forming a flow path along which the liquid moves from the water tank to an upper side of the flow liquid dust collector part, and a circulation pump pumping the liquid stored in the water tank to the liquid supply path to allow the liquid to move along the liquid supply path, wherein the counter unit and the flow liquid dust collector part are plurally provided, and the flow liquid dust collector part includes a flow plate made of a non-metal material, and a liquid flow part formed on the flow plate as an occupying space in which the liquid flows.

ADVANTAGEOUS EFFECTS

As described above, according to embodiments of the present inventive concept, the number and diameter value of each of the plurality of carbon fiber bundles provided in the carbon fiber brush are maximized by optimizing an air intake area, thereby achieving cost-effectiveness and a maximized charging effect.

In addition, according to embodiments of the present inventive concept, the charging device has a carbon fiber brush with 10000 to 30000 carbon fiber bundles having a diameter of 2 to 3 μm, thereby maximizing a charging effect by minimizing generation of ozone ($O_3$).

In addition, according to embodiments of the present inventive concept, the electric dust collector apparatus can prevent dust from depositing on surfaces of collecting electrodes by replacing a conventional dust collecting plate with a liquid flow dust collection part using a liquid.

In addition, according to embodiments of the present inventive concept, instead of a metal collecting plate, a liquid flow dust collector part made of a non-metal material is used, thereby preventing a spark from being generated between the dust collector part and a counter part due to dust depositing on a particular region.

In addition, according to embodiments of the present inventive concept, corrosion of a dust collector part and ozone generation can be minimized, unlike in the conventional metal collecting plate.

In addition, according to embodiments of the present inventive concept, since a metal plate is not used in a dust collector part, a surface of a product can be easily processed and the cost can be reduced.

In addition, according to embodiments of the present inventive concept, a product can be advantageously maintained and preserved by simultaneously performing dust collection and cleaning of a dust collector part by collecting dust in a flowing liquid.

In addition, according to embodiments of the present inventive concept, a metal plate of a counter unit is coated with an insulating material, thereby suppressing a risk of an electric shock accident from being caused to a user, and occurrence of a fire accident can be prevented by preventing spark generation due to a direct contact between dust and the metal plate.

In addition, according to embodiments of the present inventive concept, it is possible to prevent a metal plate of a counter unit from corroding due to a direct contact between moisture existing in the electric dust collector apparatus and the metal plate of the counter unit.

BRIEF DESCRIPTION OF THE DRAWINGS

The objects, features and advantages of the present inventive concept will be more apparent from the following detailed description in conjunction with the accompanying drawings, in which.

BEST MODE FOR CARRYING OUT THE INVENTION

<Constitutional Features of the Inventive Concept>

Figure 2:
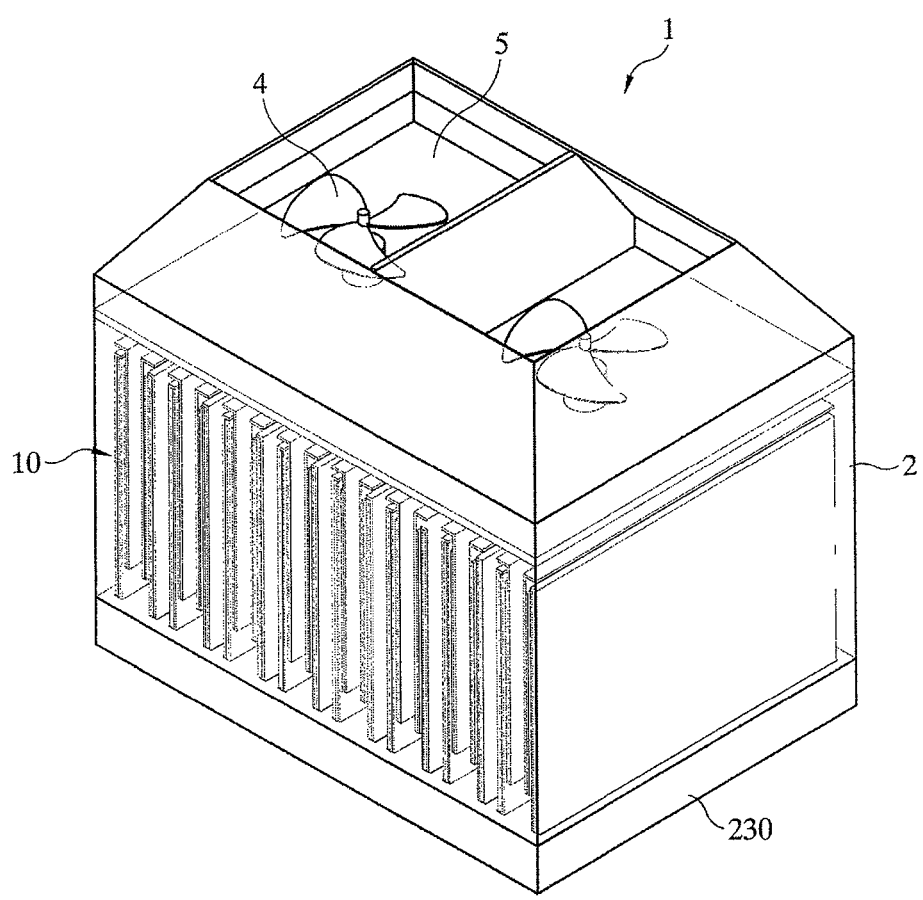
FIG. 2 is a perspective view of an electrostatic precipitator system 1 according to an embodiment of the present inventive concept.

Hereinafter, a configuration and functions of an electrostatic precipitator system 1 will be described. FIG. 2 is a perspective view of an electrostatic precipitator system 1 according to an embodiment of the present inventive concept.

As shown in FIG. 2, the electrostatic precipitator system 1 according to an embodiment of the present inventive concept largely includes a body 2, an inlet path 3 that is a passageway through which external air containing dust is induced, a ventilator 4 for inducing the external air into the body 2, a plurality of charging devices 210 and a plurality of electric dust collector apparatuses 10. In addition, the electrostatic precipitator system 1 according to an embodiment of the present inventive concept may further include a carbon filter 5 provided on the inlet path 3 before the external air is induced into the charging devices 210. The carbon filter 5 may be provided in front of the charging devices 210 in view of a flowing direction of the external air to primarily adsorb the dust contained in the external air induced into the electrostatic precipitator system 1. The carbon filter 5 includes activated carbon and prevents the dust from escaping by adsorbing the dust into micro-pores existing on the carbon filter 5.

Air purification using the electrostatic precipitator system 1 according to an embodiment of the present inventive concept is generally performed such that the external air induced through the ventilator 4 is charged by the charging devices 210 to have a particular polarity, the charged dust is collected by the electric dust collector apparatuses 10, and purified air is then discharged. Hereinafter, configurations and functions of each of the charging devices 210 and each of the electric dust collector apparatuses 10, which are essential components of the electrostatic precipitator system 1 according to an embodiment of the present inventive concept, will be described in more detail. The charging device 210 and the electric dust collector apparatus 10 that follow may be plurally provided in the electrostatic precipitator system 1, as shown in FIG. 2.

Figure 3:
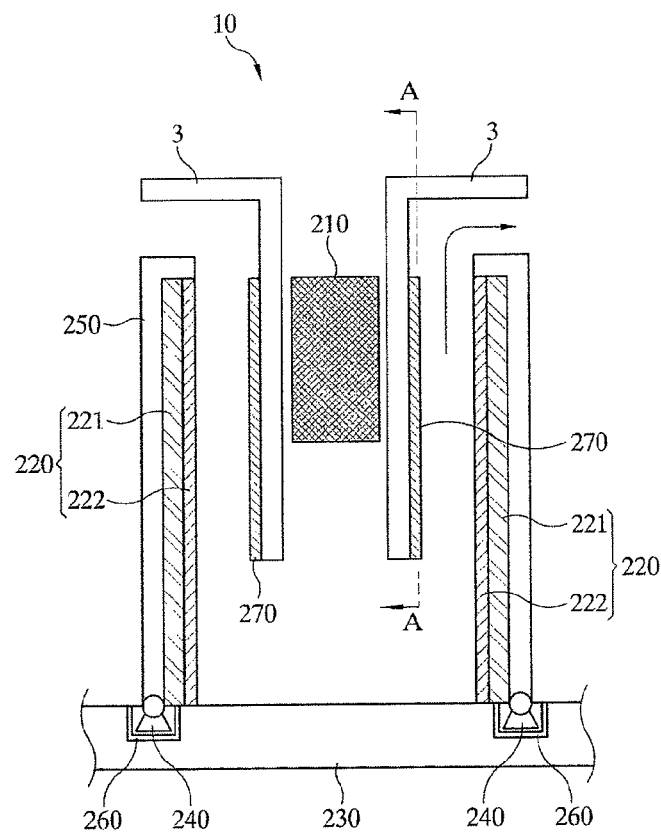
FIG. 3 is a partially cross-sectional view of an electrostatic precipitator system 1 according to an embodiment of the present inventive concept.

FIG. 3 is a partially cross-sectional view of an electrostatic precipitator system 1 according to an embodiment of the present inventive concept. As shown in FIG. 3, the electrostatic precipitator system 1 according to an embodiment of the present inventive concept may include a charging device 210 charging dust contained in induced external air, and an electric dust collector apparatus 10 positioned next to the charging device 210 in view of a flowing direction of the external air and collects the dust charged by the charging device 210 in a flowing liquid.

In addition, the electric dust collector apparatus 10 may include a flow liquid dust collector part 220 collecting the charged dust in the liquid flowing to its one side surface, a water tank 230 storing the liquid flowing in the flow liquid dust collector part 220, a liquid supply path 250 forming a flow path between the water tank 230 and the flow liquid dust collector part 220 to allow the liquid to move from the water tank 230 to the flow liquid dust collector part 220, a circulation pump 240 pumping the liquid stored in the water tank 230 to the liquid supply path 250 to allow the liquid to move to an upper side of the flow liquid dust collector part 220 along the liquid supply path 250, a water tank filter 260 removing foreign matter contained in the liquid induced into the liquid supply path 250, and a counter unit 270 located opposite to the flow liquid dust collector part 220 and including a metal plate 271 charged with the same polarity with the dust charged by the charging device 210 and a coating 272 made of an insulating material. The foreign matter may include charged dust, dust, and etc.

Figure 4:
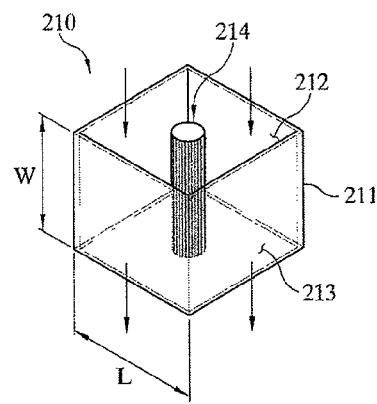
FIG. 4 is a perspective view of a charging device according to an embodiment of the present inventive concept.

The following description will focus on a configuration and functions of the charging device 210 according to an embodiment of the present inventive concept. FIG. 4 is a perspective view of the charging device 210 according to an embodiment of the present inventive concept.

The charging device 210 according to an embodiment of the present inventive concept charges the dust contained in the external air induced into the electrostatic precipitator system 1 by a high-voltage discharge. As shown in FIG. 4, the charging device 210 according to an embodiment of the present inventive concept includes a metal body 211 having an inlet 212 through which external air containing dust is induced and an outlet 213 through which charged external air is discharged, a carbon fiber brush 214 with a plurality of carbon fiber bundles, the carbon fiber brush 214 provided in an internal space of the metal body 211 and having a particular polarity by a high voltage applied thereto to charge the dust contained in the external air induced through the inlet 212.

According to an embodiment of the present inventive concept, the metal body 211 is preferably formed of a rectangular metal plate having a rectangular plane section. In a specific embodiment, the rectangular metal plate has a length, height (W) in a range of approximately 5 to 10 cm (preferably 7 cm) and a width (L) in a range of approximately 7 to 13 cm (preferably 10 cm). When the inlet 212 through which the external air is absorbed has too large an area, charging efficiency is reduced. Accordingly, the area of the inlet 212 is preferably approximately 100 $cm^2$.

In addition, as shown in FIG. 4, the charging device 210 according to an embodiment of the present inventive concept may include the carbon fiber brush 214 with a plurality of carbon fiber bundles at a center of the internal space of the metal body 211. If each of the carbon fiber bundles constituting the carbon fiber brush 214 has a large diameter, a relatively high voltage (approximately −10 kV) is required to perform ionization. In this case, however, ozone ($O_3$) may be generated by a corona discharge. On the other hand, if the diameter of each of the carbon fiber bundles is overly small, the production cost may increase. Therefore, according to an embodiment of the present inventive concept, the diameter of each of the carbon fiber bundles is preferably limited to be in a range of approximately 2 to 5 μm.

In addition, the carbon fiber brush 214 according to an embodiment of the present inventive concept includes approximately 10,000 to 30,000 carbon fiber bundles. In a specific embodiment, the carbon fiber brush 214 with approximately 12,000 carbon fiber bundles having a diameter in a range of approximately 2 to 5 μm was used.

Charging using the charging device 210 according to an embodiment of the present inventive concept is performed such that a particular voltage is applied to the carbon fiber brush 214 provided in the internal space of the metal body 211 of the charging device 210 in the electrostatic precipitator system 1 by a voltage applying part 215.

The external air containing dust is guided by the ventilator 4 and is induced into the internal space of the metal body 211 of the charging device 210 through the inlet 212. Then, the dust contained in the external air is charged with the same polarity with the carbon fiber brush 214 by the carbon fiber brush 214 with 10,000 to 30,000 carbon fiber bundles.

Next, the external dust containing charged dust is discharged to the electric dust collector apparatus 10 of the electrostatic precipitator system 1 through the outlet 213 of the metal body 211. In addition, a controller 290 controls the voltage applying part 215 of the charging device 210 to adjust the particular voltage applied to the carbon fiber brush 214. The particular voltage is preferably in a range of −4 to −6 kV.

Figure 5:
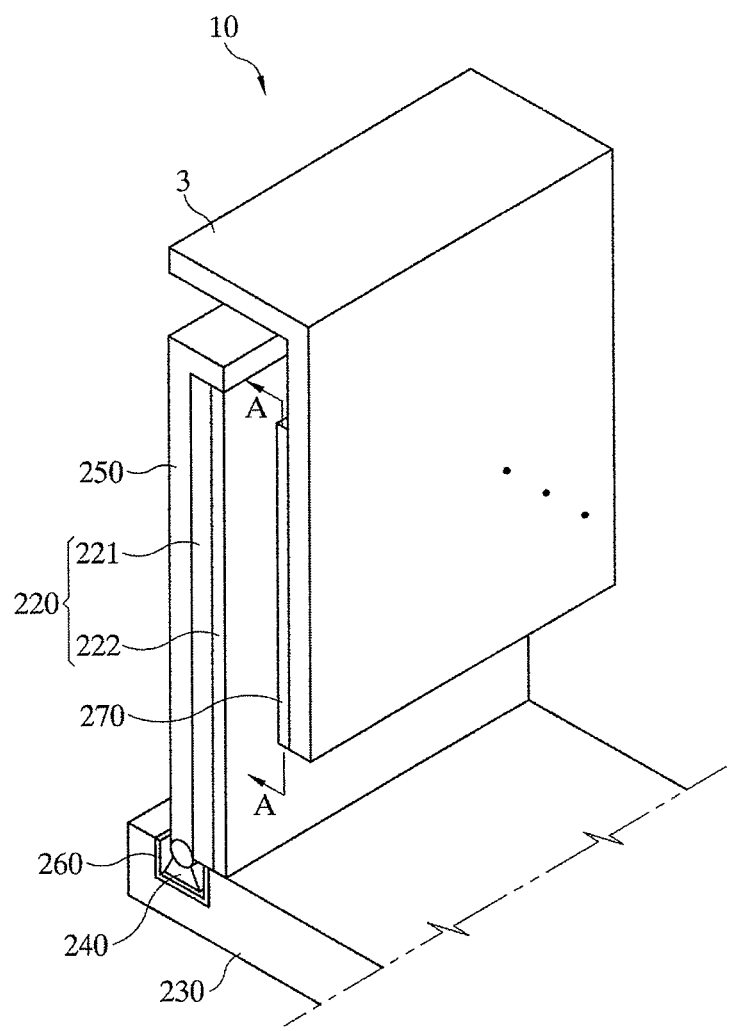
FIG. 5 is a perspective view of an electric dust collector apparatus 10 according to an embodiment of the present inventive concept.

The following description will focus on a configuration and functions of the electric dust collector apparatus 10 provided in the electrostatic precipitator system 1 according to an embodiment of the present inventive concept. As described above, the electric dust collector apparatus 10 according to an embodiment of the present inventive concept may be plurally provided in the body 2 and is positioned next to the charging device 210 in view of a flowing direction of the external air. Therefore, the external air containing dust charged by the charging device 210 is induced into the electric dust collector apparatus 10. FIG. 5 is a perspective view of an electric dust collector apparatus 10 according to an embodiment of the present inventive concept.

As shown in FIG. 5, the electric dust collector apparatus 10 according to an embodiment of the present inventive concept includes a flow liquid dust collector part 220 collecting the dust charged by the charging device 210 in the liquid flowing from its upper side to its lower side along its one side surface, a water tank 230 storing the liquid flowing in the flow liquid dust collector part 220, a liquid supply path 250 forming a flow path between the water tank 230 and the flow liquid dust collector part 220 to allow the liquid to move from the water tank 230 to the flow liquid dust collector part 220, a circulation pump 240 pumping the liquid stored in the water tank 230 to allow the liquid to move to an upper side of the flow liquid dust collector part 220 along the liquid supply path 250, a water tank filter 260 provided between the water tank 230 and the liquid supply path 250 and removing foreign matter contained in the liquid induced into the liquid supply path 250, and a counter unit 270 located opposite to the flow liquid dust collector part 220 and including a metal plate 271 charged with the same polarity with the dust charged by the charging device 210 and a coating 272 formed by coating an insulating material on the metal plate 271 to guide the external air containing the charged dust toward one side surface of the flow liquid dust collector part 220. The foreign matter may include charged dust, dust, and etc.

The flow liquid dust collector part 220 according to an embodiment of the present inventive concept is provided next to the charging device 210 in view of a flowing direction of the external air. The flow liquid dust collector part 220 includes a flow plate 221 and a liquid flow part 222 formed as a space occupied by the liquid flowing on the flow plate 221. The flow plate 221 is preferably made of a non-metal material. In addition, the liquid flowing along one side surface of the flow liquid dust collector part 220 is supplied from the water tank 230.

The dust charged by the charging device 210 is collected in the liquid flowing on the flow plate 221 of the flow liquid dust collector part 220 while moving along the flowing direction of the external air. The following experimental data shows the efficiency of collecting charged dust in a liquid in a case where the liquid flowing on the flow plate 221 is water in a ground state in which no voltage is applied to the liquid, and the counter unit 270 is not provided. The data of the dust collecting efficiency shown in Table 1 may vary within a range of a predetermined error allowance according to given experimental conditions.

TABLE 1

| Voltage applied to liquid (kV) | Dust polarity | Dust collecting efficiency (%) |
| --- | --- | --- |
| 0 | minus | 4.7 |
| 0 | plus | 3 |

In order to increase the dust collecting efficiency, a predetermined voltage may be applied to the liquid flowing on the flow plate 221 so as to give the liquid a polarity that is the same with or opposite to that of the dust charged by the charging device 210. In order to make the liquid flowing on the flow plate 221 have a polarity, a voltage may be directly applied to the liquid stored in the water tank 230.

As shown in Table 1, in the case where no voltage is applied to the liquid and the counter unit 270 is not provided, the dust collecting efficiency was considerably low.

The following experimental data shows the efficiency of collecting charged dust in a liquid in a case where the liquid flowing on the flow plate 221 is water in a charged state in which the liquid is charged with the same polarity with that of the dust charged by the charging device 210. The efficiency data shown in Table 2 may vary within a range of a predetermined error allowance under given experimental conditions.

TABLE 2

| Voltage applied to liquid (kV) | Dust polarity | Dust collecting efficiency (%) |
| --- | --- | --- |
| −12 | Minus | 15.6 |
| −10 | Minus | 14.4 |
| −8 | Minus | 16 |
| −6 | Minus | 11.8 |
| −4 | Minus | 11 |
| −2 | Minus | 9.6 |
| 2 | Plus | 2.2 |

TABLE 2-continued

| Voltage applied to liquid (kV) | Dust polarity | Dust collecting efficiency (%) |
|---|---|---|
| 4 | Plus | 1.4 |
| 6 | Plus | 3 |
| 8 | Plus | 5.8 |
| 10 | Plus | 6.6 |
| 12 | Plus | 8.8 |

The following experimental data shows the efficiency of collecting charged dust in a liquid in a case where the liquid flowing on the flow plate 221 is water in a charged state in which the liquid is charged with the opposite polarity to that of the dust charged by the charging device 210. The efficiency data shown in Table 3 may vary within a range of a predetermined error allowance under given experimental conditions.

TABLE 3

| Voltage applied to liquid (kV) | Dust polarity | Dust collecting efficiency (%) |
|---|---|---|
| −12 | Plus | 13.2 |
| −10 | Plus | 11.2 |
| −8 | Plus | 10.2 |
| −6 | Plus | 10.2 |
| −4 | Plus | 11.6 |
| −2 | Plus | 9.6 |
| 2 | Minus | 11.8 |
| 4 | Minus | 16.4 |
| 6 | Minus | 21 |
| 8 | Minus | 26.8 |
| 10 | Minus | 35 |
| 12 | Minus | 36.2 |

As shown in Tables 2 and 3, when the voltage applied to the liquid has the opposite polarity to that of the dust, an attraction is applied to between the flowing liquid and the dust, thereby increasing the dust collecting efficiency. However, when a high voltage is applied to the liquid, there is a risk of electric shocks, which is an undesirable problem.

Therefore, according to an embodiment of the present inventive concept, no voltage is applied to the liquid and the counter unit 270 including the coating 272 formed by coating the metal plate 271 with an insulating material, thereby providing the electric dust collector apparatus 10 having enhanced dust collecting efficiency.

In addition, the flow plate 221 functions as a passage to allow the liquid to flow on the flow liquid dust collector part 220. As described above, the flow plate 221 is made of a non-conductive material, and the shape of the liquid flow part 222 is determined according to the shape of the flow plate 221. Therefore, the overall shape and area of the flow liquid dust collector part 220 can be determined by the shape of the flow plate 221.

As shown in FIG. 5, the liquid stored in the water tank 230 is pumped by the circulation pump 240 to then be sent to an upper side of the flow liquid dust collector part 220 along the liquid supply path 250 provided between the water tank 230 and the flow liquid dust collecting part 220.

The liquid supply path 250 is a passage that allows the liquid stored in the water tank 230 to move to the flow liquid dust collector part 220 and is preferably formed of a member having non-conductivity and water resistance. The liquid having stopped flowing on the flow liquid dust collector part 220 is induced back to the water tank 230. Then, the liquid induced into the water tank 230 is again pumped by the circulation pump 240 to then circulate while being supplied to the upper side of the flow liquid dust collector part 220 through the liquid supply path 250.

In addition, as shown in FIG. 5, the electric dust collector apparatus 10 according to an embodiment of the present inventive concept further includes the water tank filter 260 provided within the water tank 230 for removing dust contained in the liquid induced into the liquid supply path 250. That is to say, since the liquid flowing on the flow plate 221 of the flow liquid dust collector part 220 is induced into the water tank 230 by collecting the dust charged by the charging device 210, it is necessary to remove the dust in order for the liquid stored in the water tank 230 to be supplied again to the flow liquid dust collector part 220. The water tank filter 260 is provided on a passage between the water tank 230 and the liquid supply path 250 to remove dust contained in the liquid, thereby preventing the dust contained in the liquid from being supplied to the flow liquid dust collector part 220 together with the liquid.

In addition, as shown in FIG. 5, the electric dust collector apparatus 10 according to an embodiment of the present inventive concept includes the counter unit 270 in the absence of voltage applied thereto, and guides the external air to one side surface of the flow liquid dust collector part 220, thereby increasing the dust collecting efficiency.

Figure 6:
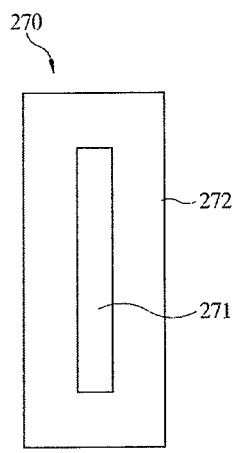
FIG. 6 is a cross-sectional view of a counter unit according to an embodiment of the present inventive concept.

FIG. 6 is a cross-sectional view of the counter unit 270 according to an embodiment of the present inventive concept. That is to say, FIG. 6 is a cross-sectional view taken along the line A-A of FIG. 5. As shown in FIG. 6, the counter unit 270 according to an embodiment of the present inventive concept includes a metal plate 271 charged with the same polarity with the dust charged by a voltage applying part 280 of electric dust collector apparatus, and a coating 272 formed by coating the metal plate 271 with an insulating material. The counter unit 270 is located opposite to and to face the flow liquid dust collector part 220. The insulating material may include plastic, PP, PE, PC, and so on.

According to an embodiment of the present inventive concept, since the counter unit 270 and the dust charged by the charging device 210 have the same polarity, an electrically repulsive force is generated between the counter unit 270 and the dust charged by the charging device 210. In addition, since the dust moves toward the flow liquid dust collector part 220 facing the counter unit 270 by the repulsive force, the efficiency of collecting the dust in the liquid flowing on the flow plate 221 of the flow liquid dust collector part 220 can be increased.

The following experimental data shows comparative data values of the efficiency of collecting the dust charged by the charging device 210 according to an embodiment of the present inventive concept in the liquid flowing on the flow plate 221 of the flow liquid dust collector part 220. Here, the comparative data values result from experiments conducted in a case where the counter unit 270 is provided and in a case where the counter unit 270 is not provided. In conducting the experiments, plastic was used as the insulating material for coating the metal plate 271 of the counter unit 270 and the following efficiency may vary within a range of error allowance under given experimental conditions.

TABLE 4

| Presence of counter unit | Voltage applied to liquid (kV) | Voltage applied to metal plate (kV) | Dust polarity | Dust collecting efficiency (%) |
|---|---|---|---|---|
| No | 0 | 0 | Minus | 6 |
| Yes | 0 | −15 | Minus | 37.85 |

As confirmed from the numerical values shown in Table 4, the dust collecting efficiency was higher in a case where the counter unit 270 including the metal plate 271 having a voltage applied thereto with the same polarity with the dust is provided than in a case where the counter unit 270 is not provided. In addition, in a case where no voltage is applied to the liquid, the dust collecting efficiency was the same with or higher than that in a case where a voltage is applied to the liquid as shown in Table 3.

It was also understood that an electrically repulsive force was applied to between the metal plate 271 and the dust even when the metal plate 271 is coated with an insulating material, and the dust collecting efficiency was not considerably lowered by the coating 272.

In the electric dust collector apparatus 10 according to an embodiment of the present inventive concept, since the metal plate 271 of the counter unit 270 is coated with the coating 272 made of an insulating material, it is possible to prevent a spark from being generated due to a direct contact between the metal plate 271 and the dust. In addition, since the metal plate 271 of the counter unit 270 is coated with the coating 272 made of an insulating material, an electric shock accident may be prevented from being caused to a user due to a direct contact between the user and the metal plate 271. Further, since the metal plate 271 of the counter unit 270 is coated with the coating 272 made of an insulating material, it is also possible to prevent the metal plate 271 from corroding due to a direct contact between moisture existing in the electric dust collector apparatus 10 and the metal plate 271.

In addition, even if the metal plate 271 of the counter unit 270 is coated with an insulating material, an electrically repulsive force between the metal plate 271 and the dust is still retained, thereby increasing the dust collecting efficiency.

Figure 7:
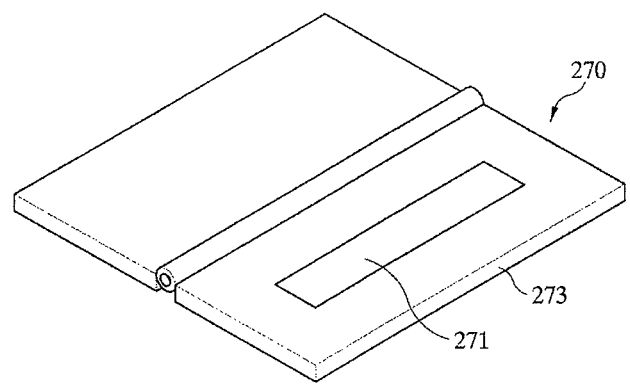
FIG. 7 is a perspective view of a counter unit having a foldable insulation case according to another embodiment of the present inventive concept and FIG. 8 is a perspective view of a counter unit having a foldable insulation case according to still another embodiment of the present inventive concept.
Figure 8:
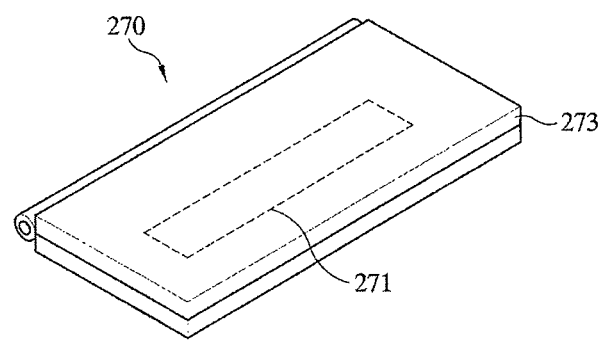

FIG. 7 is a perspective view of a counter unit 270 having a foldable insulation case 273 according to another embodiment of the present inventive concept and FIG. 8 is a perspective view of a counter unit 270 having a foldable insulation case 273 according to still another embodiment of the present inventive concept.

As shown in FIGS. 7 and 8, the counter unit 270 may include a metal plate 271 charged with the same polarity with the dust charged by the charging device 210 and a foldable insulation case 273 capable of receiving the metal plate 271. Therefore, the foldable insulation case 273 according to still another embodiment of the present inventive concept is a case configured to be openable and made of an insulating material and the metal plate 271 can be receiving, discharged or replaced using the foldable insulation case 273.

<Operating Method of the Inventive Concept>

Figure 9:
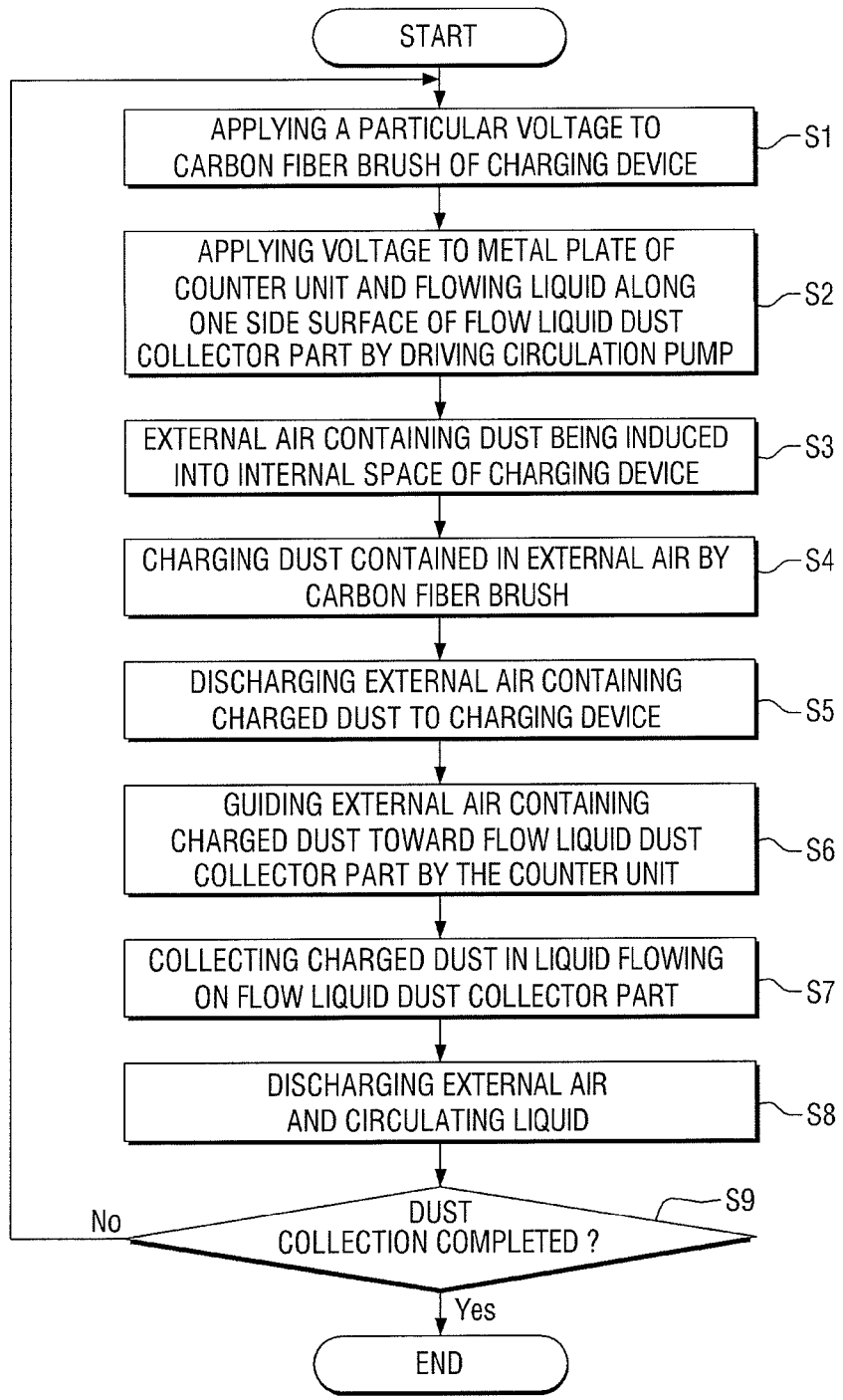
FIG. 9 is a flowchart illustrating a method of purifying air using an electrostatic precipitator system according to an embodiment of the present inventive concept.
Figure 10:
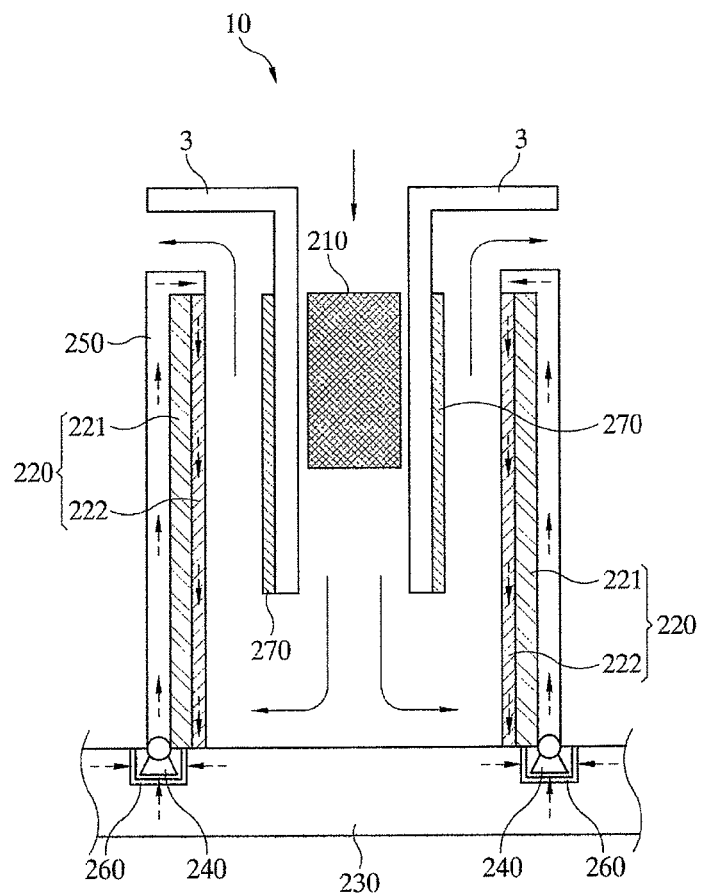
FIG. 10 is a partially cross-sectional view of the electrostatic precipitator system shown in FIG. 9, illustrating flows of external air and liquid.
Figure 11:
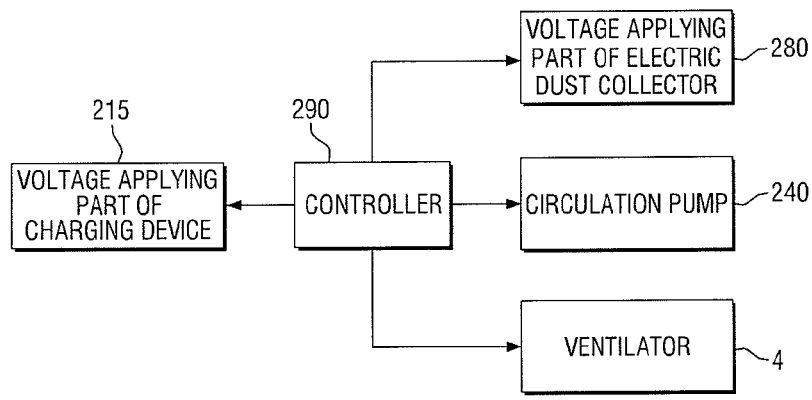
FIG. 11 is a block diagram illustrating the flow of signals derived from a controller according to an embodiment of the present inventive concept.

The air purification using the electrostatic precipitator system 1 will now be described. FIG. 9 is a flowchart illustrating a method of purifying air using the electrostatic precipitator system 1 according to an embodiment of the present inventive concept. FIG. 10 is a partially cross-sectional view of the electrostatic precipitator system 1 according to an embodiment of the present inventive concept, illustrating flows of external air and liquid. In FIG. 10, the arrow indicated by solid line denotes the flow of external air and the arrow indicated by dotted line denotes the flow of liquid. FIG. 11 is a block diagram illustrating the flow of signals derived from the controller 290 according to an embodiment of the present inventive concept.

First, a particular voltage is applied to the carbon fiber brush 214 installed in the internal space of the metal body 211 of the charging device 210 provided in the electrostatic precipitator system 1 by the voltage applying part 215 of the charging device 210 (S1).

Then, a voltage having the same polarity with the dust to be charged is applied to the metal plate 271 of the counter unit 270 by the voltage applying part 280 of electric dust collector apparatus, and the circulation pump 240 is driven to allow the liquid stored in the water tank 230 to be induced into the liquid supply path 250 to flow along one side surface of the flow liquid dust collector part 220 (S2).

Next, the ventilator 4 is driven to allow the external air containing dust to be induced into the internal space of the metal body 211 of the charging device 210 through the liquid supply path 250 (S3).

The dust contained in the external air is charged by the carbon fiber brush 214 with 10,000 to 30,000 carbon fiber bundles to have the same polarity with the carbon fiber brush 214 (S4). Then, the external air containing the charged dust is discharged to the electric dust collector apparatus 10 of the electrostatic precipitator system 1 through the outlet 213 of the metal body 211 (S5).

In this stage, the controller 290 controls the voltage applying part 215 of the charging device 210 to adjust the particular voltage applied to the carbon fiber brush 214, and the particular voltage is preferably in a range of −4 to −6 kV.

The external air having charged dust is guided toward the flow liquid dust collector part 220 by the counter unit 270 having the same polarity with the charged dust (S6). Next, the charged dust is collected in the liquid flowing on the flow liquid dust collector part 220 (S7), the external air is discharged and the liquid having the dust collected therein flows into the water tank 230 (S8).

In addition, the liquid having the dust collected therein is induced into the water tank 230 and is then circulated along the flow liquid dust collector part 220 through the liquid supply path 250 by the circulation pump 240, and foreign matter contained in the liquid induced to the liquid supply path 250 is removed by the water tank filter 260 provided between the water tank 230 and the liquid supply path 250. The foreign matter may include charged dust, dust, and etc.

The above-described procedure lasts until dust collection from the external air is completed.

As shown in FIG. 11, the controller 290 may also control the voltage applying part 280 of electric dust collector apparatus to adjust the particular voltage applied to the metal plate 271 of the counter unit 270. In addition, the controller 290 may control the ventilator 4 for inducing the external air into the electric dust collector apparatus 10 to adjust the flow rate of the external air. Further, the controller 290 may control the circulation pump 240 to adjust the flow rate of the liquid flowing along the liquid supply path 250 and the flow liquid dust collector part 220.

Next, a flow liquid dust collector part provided in the electrostatic precipitator system 1 will be described.

Figure 12:
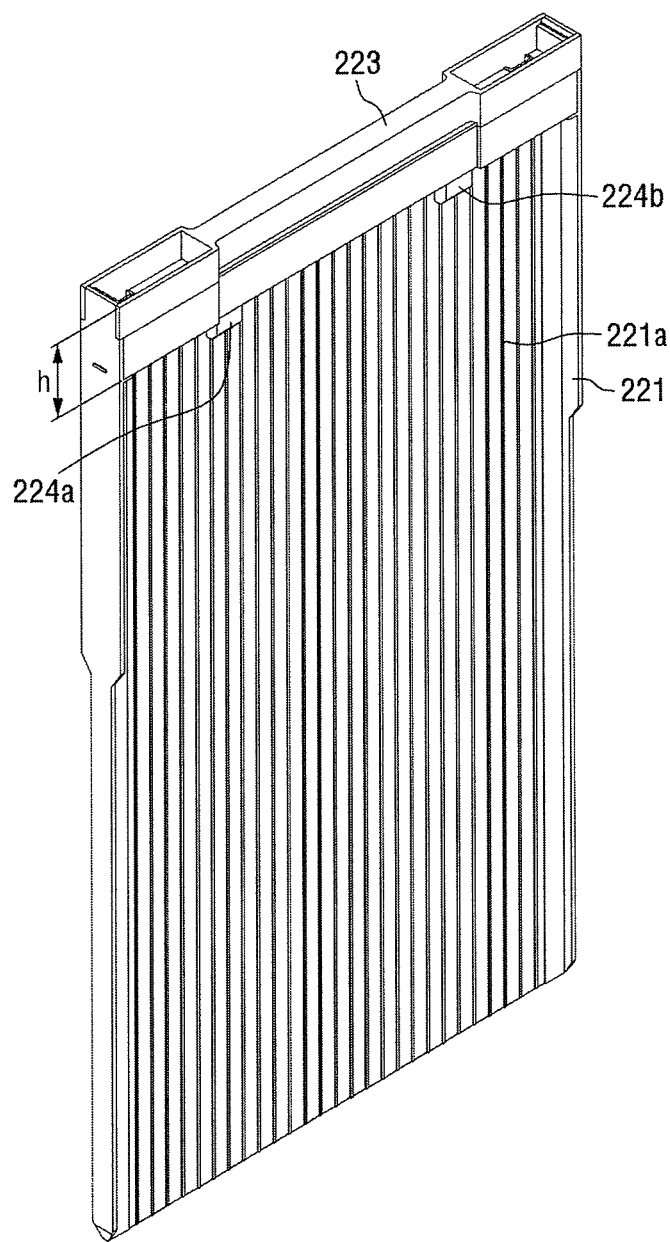
FIG. 12 is a partially perspective view of a flow liquid dust collector part according to an embodiment of the present inventive concept.
Figure 13:
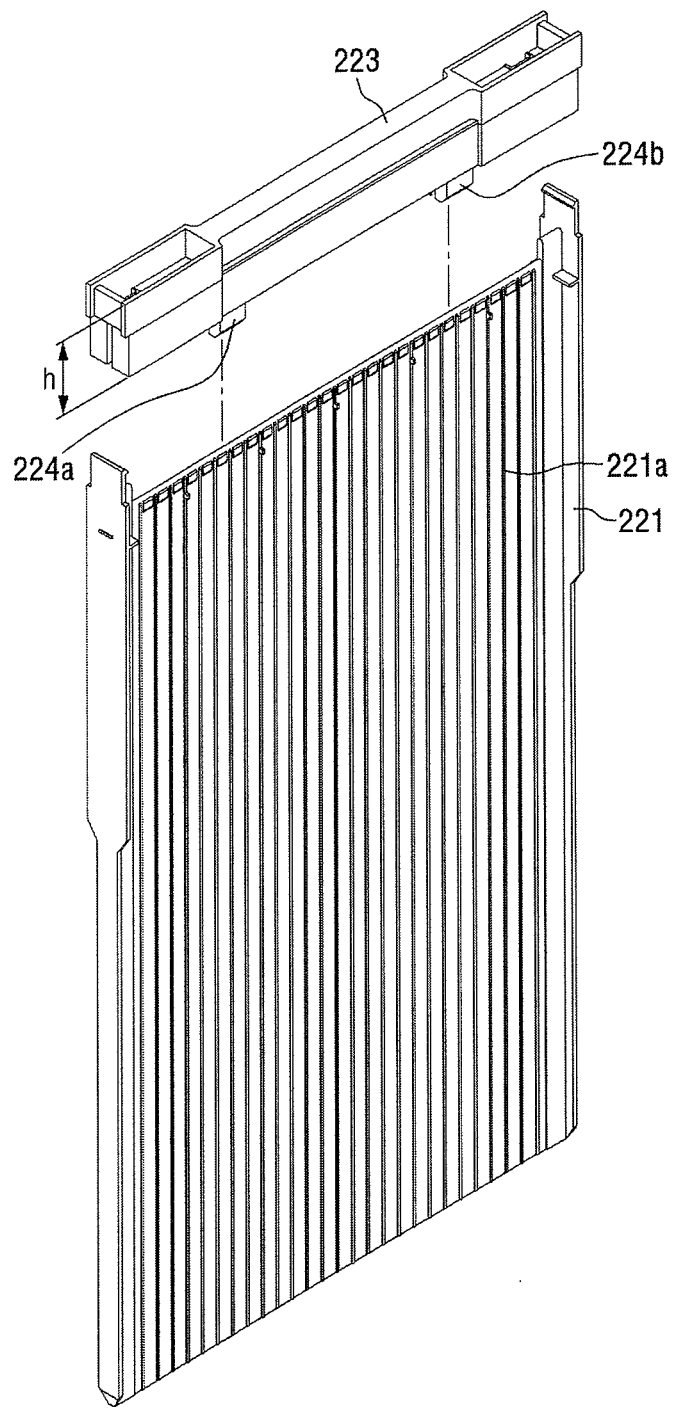
FIG. 13 is a partially exploded perspective view of the flow liquid dust collector part shown in FIG. 12.
Figure 14:
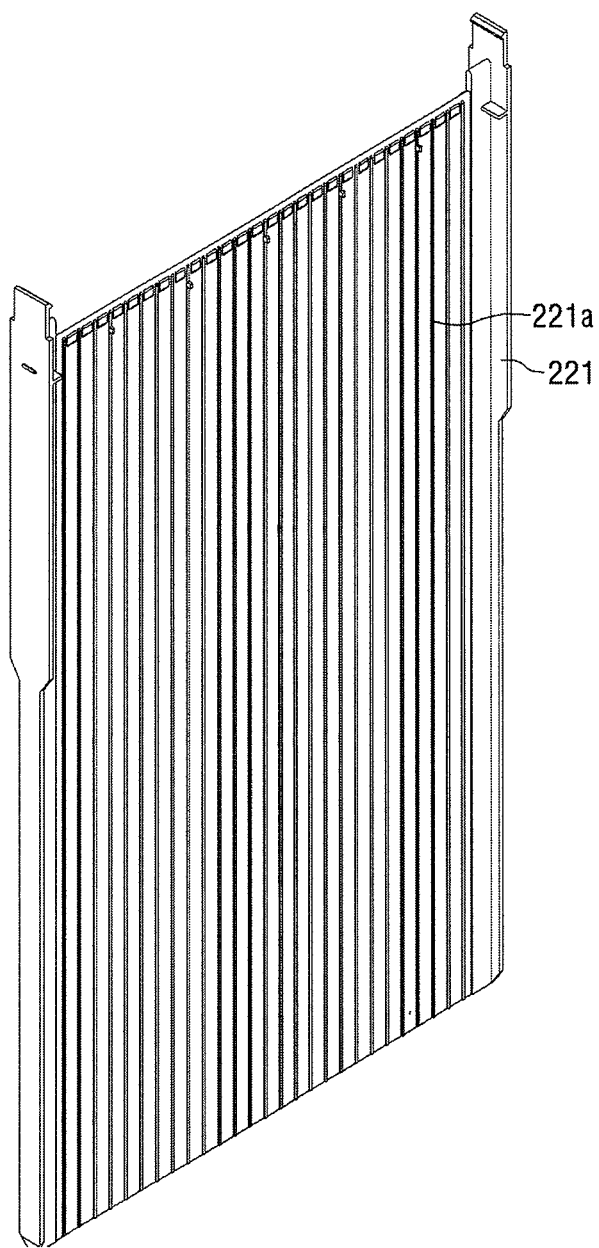
FIG. 14 is a perspective view of a flow plate according to an embodiment of the present inventive concept.
Figure 15:
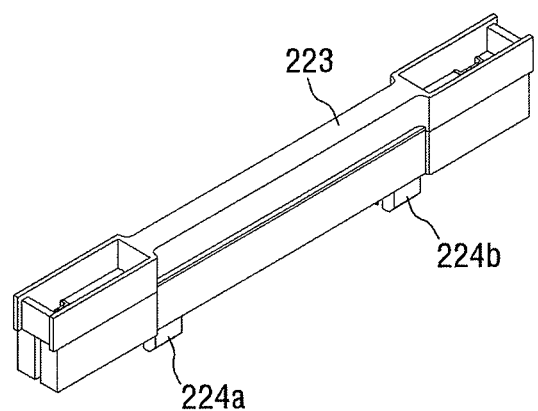
FIG. 15 is a perspective view of a flow liquid passage part according to an embodiment of the present inventive concept.
Figure 16:
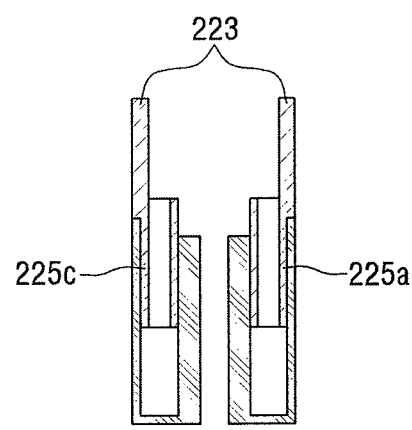
FIG. 16 is a cross-sectional view taken along the line A-A of FIG. 15.
Figure 17:
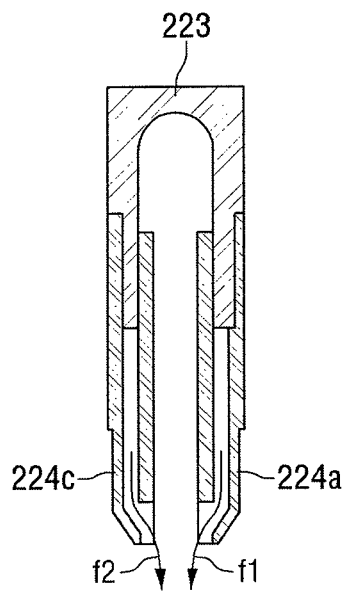
FIG. 17 is a cross-sectional view taken along the line B-B of FIG. 15.
Figure 18:
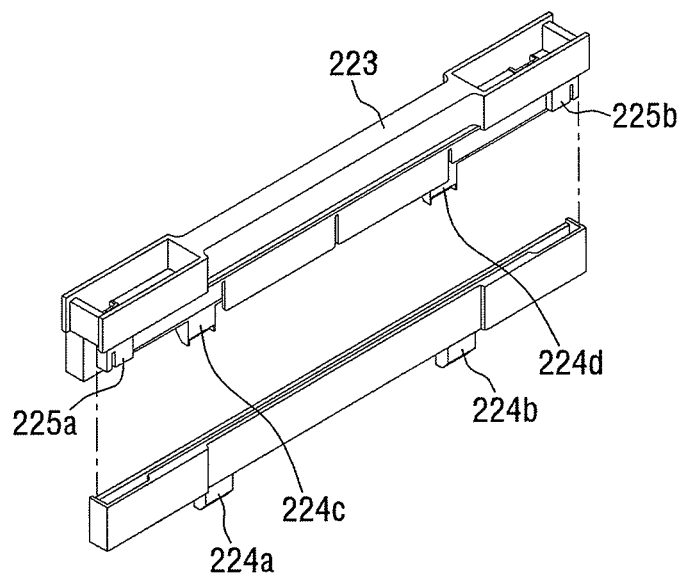
FIG. 18 is a partially exploded perspective view of the flow passage part shown in FIG. 15.

FIG. 12 is a partially perspective view of a flow liquid dust collector part according to an embodiment of the present inventive concept, FIG. 13 is a partially exploded perspective view of the flow liquid dust collector part shown in FIG. 12, FIG. 14 is a perspective view of a flow plate according to an embodiment of the present inventive concept, FIG. 15 is a perspective view of a flow liquid passage part according to an embodiment of the present inventive concept, FIG. 16 is a cross-sectional view taken along the line A-A of FIG. 15, FIG. 17 is a cross-sectional view taken along the line B-B of FIG. 15, and FIG. 18 is a partially exploded perspective view of the flow passage part shown in FIG. 15.

Figure 1:
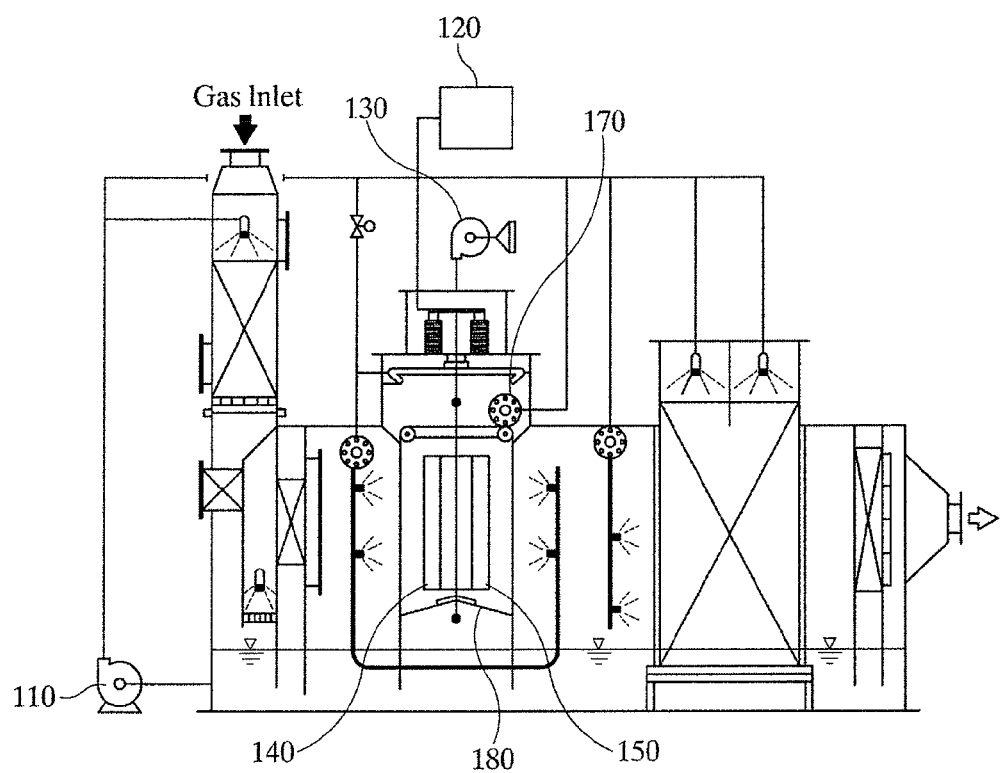
FIG. 1 is a cross-sectional view of a wet electrostatic precipitator including a conventional continuous dust collector cleaning apparatus.

Referring to FIGS. 12 to 1, the flow liquid dust collector part 220 according to an embodiment of the present inventive concept includes a flow plate 221 and a flow liquid passage part 223.

The flow plate 221 has a pattern 221a configured such that a liquid is dispersed therein and flows. The flow plate 221 serves to collect charged dust particles. In the flow plate 221 according to the present inventive concept, since a liquid serves as a dust collecting part, the liquid flows along the flow plate 221. Here, since the pattern 221a is formed on the flow plate 221, the liquid flowing along the flow plate 221 is substantially uniformly dispersed and then flows. If the pattern 221a is not provided in the flow plate 221, the liquid may concentrate on one side of the flow plate 221 due to its viscosity to then flow. To avoid this, the pattern 221a is formed on the flow plate 221.

The pattern 221a may be formed on front and back surfaces of the flow plate 221. That is to say, the liquid flowing along the flow plate 221 may flow to opposite surfaces (that is, front and back surfaces) of the flow plate 221. In such a manner, the dust collecting efficiency can be increased by allowing the liquid to flow to opposite surfaces of the flow plate 221. The pattern 221a formed on the front surface of the flow plate 221 and the pattern 221a formed on the back surface of the flow plate 221 may have the same shape, but aspects of the present inventive concept are not limited thereto. That is to say, when necessary, the pattern 221a formed on the front surface of the flow plate 221 and the pattern 221a formed on the back surface of the flow plate 221 may have different shapes. The pattern 221a may include stripes, but aspects of the present inventive concept are not limited thereto. In addition, when the pattern 221a may include stripes, intervals between each of the stripes of the pattern 221a may be constant, but aspects of the present inventive concept are not limited thereto. When the pattern 221a may include stripes, the interval between each of the stripes of the pattern 221a or a depth of grooves provided between the stripes may be so defined as to maximize the dust collecting efficiency.

In addition, the flow plate 221 may be coated with a hydrophilic material. Accordingly, the liquid flowing along the flow plate 221 may be evenly dispersed to then flow. This is for the purpose of increasing the efficiency of collecting charged dust particles.

The flow liquid passage part 223 is coupled to a top portion of the flow plate 221 and the liquid supplied to the flow plate 221 flows through the flow liquid passage part 223. In order to supply a liquid to the flow plate 221, it is necessary to provide a liquid supply part. The liquid supplied through the liquid supply part flows into the flow liquid passage part 223 coupled to the top portion of the flow plate 221 and is supplied to the whole surface of the flow plate 221 while flowing in the flow liquid passage part 223. Since small holes are formed in the flow liquid passage part 223, a small amount of the liquid can be substantially constantly supplied to the flow plate 221. In addition, the small holes allow the liquid to be supplied to the whole surface of the flow plate 221.

The flow liquid passage part 223 includes overflow preventing parts 224a, 224b, 224c and 224d preventing the liquid flowing therein from overflowing. When the liquid flows in the flow liquid passage part 223 to a predetermined height or greater, the overflow preventing parts 224a, 224b, 224c and 224d guide the liquid flowing in the flow liquid passage part 223 to flow to the flow plate 221. If the liquid is supplied to the flow plate 221 to a height exceeding a height (h) of the flow liquid passage part 223, an overflow phenomenon may occur. If the overflow phenomenon occurs, other parts around of the flow plate 221 may be affected. In particular, in an electronic product, safety-related accidents, such as leakage of electricity, electric shocks, etc., are likely to occur due to a contact between the electronic product and a liquid. Accordingly, the overflow phenomenon should be importantly prevented.

Referring to FIG. 17, a cross-sectional view illustrating the overflow preventing parts 224a and 224c is illustrated. First, the liquid supplied to the flow liquid passage part 223 is supplied to the flow plate 221 while flowing in the flow liquid passage part 223. When an amount of the liquid supplied to the flow liquid passage part 223 is larger than that of the liquid supplied to the flow plate 221, an overflow phenomenon eventually occurs. Therefore, if a height of the liquid flowing in the flow liquid passage part 223 is greater than or equal to a predetermined height, the liquid flowing in the flow liquid passage part 223 is supplied to the overflow preventing parts 224a, 224b, 224c and 224d through holes 225a, 225b, 225c and 225d formed in the flow liquid passage part 223. The liquid supplied to the overflow preventing parts 224a, 224b, 224c and 224d flows to the flow plate 221, specifically toward the ground surface indicated by arrows f1 and f2, as shown in FIG. 17. The amount of the liquid flowing toward the ground surface indicated by the arrows f1 and f2 through the overflow preventing parts 224a, 224b, 224c and 224d is larger than that of the liquid supplied to the flow plate 221 for dust collection. That is to say, the holes 225a, 225b, 225c and 225d may be formed in the overflow preventing parts 224a, 224b, 224c and 224d for the purpose of discharging a large amount of the liquid through the overflow preventing parts 224a, 224b, 224c and 224d. Here, the predetermined height may be ¾ or less of the height h of the flow liquid passage part 223. The overflow preventing parts 224a, 224b, 224c and 224d may be plurally provided in the flow liquid passage part 223.

Figure 19:
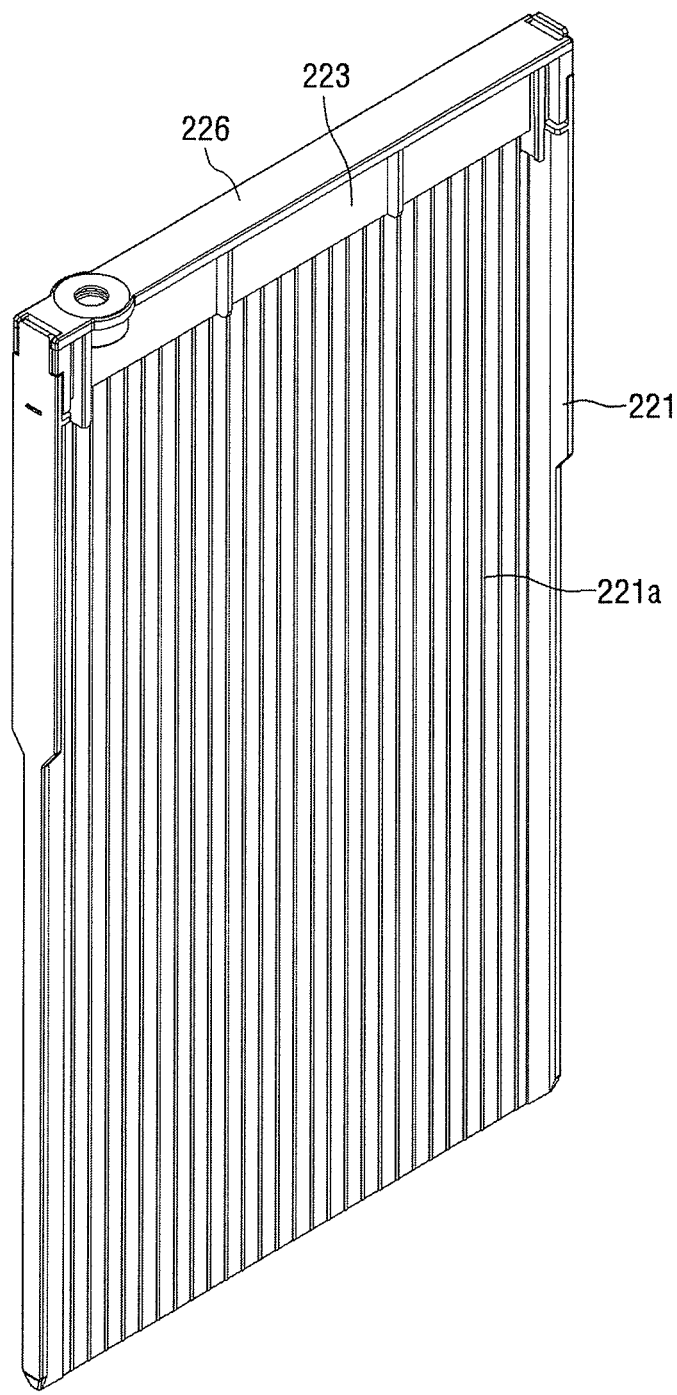
FIG. 19 is a partially perspective view of a flow liquid dust collector part according to another embodiment of the present inventive concept.
Figure 20:
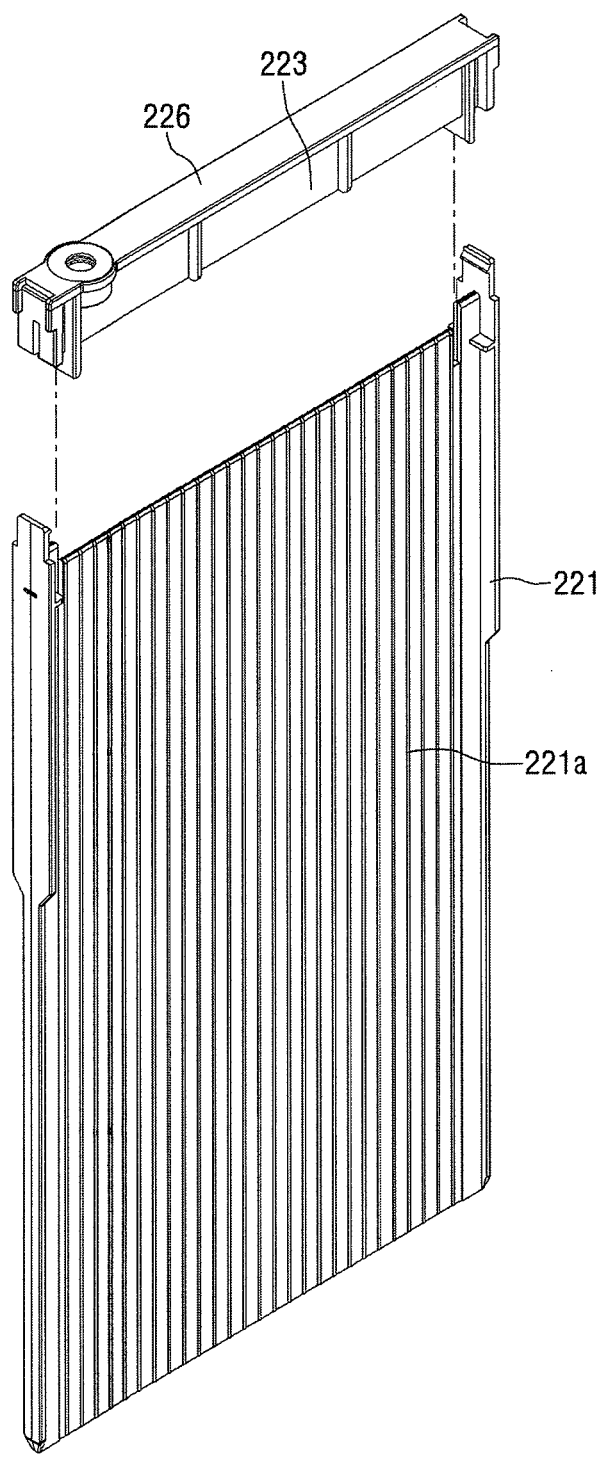
FIG. 20 is a partially exploded perspective view of the flow liquid dust collector part shown in FIG. 19.

FIG. 19 is a partially perspective view of a flow liquid dust collector part according to another embodiment of the present inventive concept, and FIG. 20 is a partially exploded perspective view of the flow liquid dust collector part shown in FIG. 19.

Referring to FIGS. 19 and 20, the flow liquid dust collector part 220 according to another embodiment of the present inventive concept includes a flow plate 221, a flow liquid passage part 223, and a cover part 226.

The flow plate 221 has a pattern 221a configured such that a liquid is dispersed therein and flows. The pattern 221a may be formed on front and back surfaces of the flow plate 221. The pattern 221a formed on the front surface of the flow plate 221 and the pattern 221a formed on the back surface of the flow plate 221 may have the same shape, but aspects of the present inventive concept are not limited thereto. That is to say, when necessary, the pattern 221a formed on the front surface of the flow plate 221 and the pattern 221a formed on the back surface of the flow plate 221 may have different shapes. The pattern 221a may include stripes, but aspects of the present inventive concept are not limited thereto. In addition, when the pattern 221a may include stripes, intervals between each of the stripes of the pattern 221a may be constant, but aspects of the present inventive concept are not limited thereto. In addition, the flow plate 221 may be coated with a hydrophilic material.

The flow liquid passage part 223 is coupled to a top portion of the flow plate 221 and the liquid supplied to the flow plate 221 flows through the flow liquid passage part 223. Since small holes are formed in the flow liquid passage part 223, a small amount of the liquid can be substantially constantly supplied to the flow plate 221. In addition, the small holes allow the liquid to be supplied to the whole surface of the flow plate 221.

The cover part 226 prevents the liquid flowing in the flow liquid passage part 223 from being discharged to the outside of the flow liquid passage part 223. That is to say, the cover part 226 is necessarily provided for the purpose of preventing the liquid supplied to the flow plate 221 from overflowing to the outside of the flow liquid passage part 223 due to an increase in the flow amount of the liquid while flowing along the flow liquid passage part 223. The cover part 226 can prevent other parts around the flow plate 221 from being affected by the overflow of the liquid flowing in the flow liquid passage part 223. In particular, in an electronic product, safety-related accidents, such as leakage of electricity, electric shocks, etc. are likely to occur due to a contact between the electronic product and a liquid. Accordingly, the overflow phenomenon should be importantly prevented.

Although exemplary embodiments of the present inventive concept have been described in detail hereinabove, it should be understood that many variations and modifications of the basic inventive concept herein described, which may appear to those skilled in the art, will still fall within the spirit and scope of the exemplary embodiments of the present inventive concept as defined by the appended claims.

What is claimed is:

1. An electric dust collector apparatus in an electrostatic precipitator system, the electric dust collector apparatus comprising:
   a flow liquid dust collector part collecting charged dust in a liquid flowing to its one side surface; and
   a counter unit located opposite to the flow liquid dust collector part and including a metal plate charged with the same polarity with the charged dust to guide the induced charged dust to flow toward the flow liquid dust collector part,
   wherein the counter unit further includes a coating including an insulating material coating the metal plate.

2. The electric dust collector apparatus of claim 1, wherein the counter unit further includes an insulation case accommodating the metal plate and including an insulating material.

3. The electric dust collector apparatus of claim 2, wherein the insulation case is configured in a foldable manner.

4. The electric dust collector apparatus of claim 1, wherein the counter unit and the flow liquid dust collector part are plurally provided, and the flow liquid dust collector part includes a flow plate made of a non-metal material and a liquid flow part on the flow plate as an occupying space in which the liquid flows.

5. The electric dust collector apparatus of claim 1, further comprising:
   a water tank storing the liquid flowing in the flow liquid dust collector part; and
   a liquid supply path forming a flow path to allow the liquid to move from the water tank to an upper side of the flow liquid dust collector part.

6. The electric dust collector apparatus of claim 5, further comprising a circulation pump pumping the liquid stored in the water tank to the liquid supply path to allow the liquid to move along the liquid supply path.

7. The electric dust collector apparatus of claim 5, further comprising a water tank filter removing foreign matter contained in the liquid induced into the liquid supply path and provided between the water tank and the liquid supply path.

8. A method for electrostatic precipitation by an electric dust collector apparatus in an electrostatic precipitator system, the method comprising:
   applying a voltage having a same polarity with charged dust to a metal plate of a counter unit by means of a voltage applying part and allowing a liquid stored in a water tank to be induced into a liquid supply path by actuating a circulation pump so that the liquid flows along a side surface of a flow liquid dust collector part;
   allowing external air having the charged dust to be induced and guiding the external air to move to the flow liquid dust collector part by means of the counter unit;
   collecting the charged dust by the liquid flowing in the flow liquid dust collector part; and
   exhausting the external air.

9. The method of claim 8, further comprising allowing the liquid having the charged dust collected therein to be induced into the water tank to circulate the induced liquid back to the flow liquid dust collector part through the liquid supply path by means of the circulation pump, and removing foreign matter contained in the liquid induced into the liquid supply path by means of water tank filter provided between the water tank and the liquid supply path.

10. The method of claim 8, further comprising adjusting a particular voltage applied to a metal plate of the counter unit by controlling the voltage applying part by means of a controller.

11. The method of claim 10, wherein the controller controls a ventilator to induce external air into the electric dust collector apparatus to adjust a flow rate of the external air flowing therein and controls the circulation pump to adjust the flow rate of liquid flowing in the liquid supply path and the flow liquid dust collector part.

* * * * *